United States Patent
Bal et al.

(10) Patent No.: US 12,055,064 B2
(45) Date of Patent: Aug. 6, 2024

(54) TURBOMACHINE WITH A SHAFT COUPLED TO AN IMPELLER WITH AN AXIALLY INTERPOSED FRICTION RING

(71) Applicant: ATLAS COPCO AIRPOWER, N.V., Wilrijk (BE)

(72) Inventors: Guido Bal, Wilrijk (BE); Mart Lybeert, Wilrijk (BE); Stefano Vagnoli, Wilrijk (BE); Hans Meeus, Wilrijk (BE); Koen Peeters, Wilrijk (BE); Bjorn Verrelst, Wilrijk (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/029,139

(22) PCT Filed: Nov. 10, 2021

(86) PCT No.: PCT/EP2021/081261
§ 371 (c)(1),
(2) Date: Mar. 29, 2023

(87) PCT Pub. No.: WO2022/101277
PCT Pub. Date: May 19, 2022

(65) Prior Publication Data
US 2023/0366316 A1    Nov. 16, 2023

(30) Foreign Application Priority Data
Nov. 16, 2020   (BE) ................................... 2020/5829

(51) Int. Cl.
*F01D 5/02*    (2006.01)
*F16D 1/076*   (2006.01)

(52) U.S. Cl.
CPC ............. *F01D 5/025* (2013.01); *F16D 1/076* (2013.01)

(58) Field of Classification Search
CPC ........ F01D 5/025; F04D 29/20; F04D 29/263; F04D 29/266
See application file for complete search history.

(56) References Cited

U.S. PATENT DOCUMENTS 7,182,579 B2 *   2/2007   Roso ....................... F01D 5/025
                                                            416/204 A
10,018,205 B2 *  7/2018   Pinkney ................ F04D 29/602

FOREIGN PATENT DOCUMENTS

| CN | 101725563 A | 6/2010 |
| CN | 102966595 A | 3/2013 |
| DE | 102007057906 A1 | 6/2009 |

(Continued)

OTHER PUBLICATIONS

International Search Report and Written Opinion in corresponding PCT Application No. PCT/EP2021/081261, dated Feb. 9, 2022.

(Continued)

*Primary Examiner* — Michael L Sehn
(74) *Attorney, Agent, or Firm* — BACON&THOMAS, PLL

(57) ABSTRACT

A turbomachine includes a shaft with a first end and an impeller arranged at and coupled to the first end of the shaft, arranged together to rotate about an axis of rotation. The turbomachine further includes a friction ring clamped between an axial surface at the first end of the shaft and an opposite axial surface of the impeller.

13 Claims, 3 Drawing Sheets

(56) References Cited

FOREIGN PATENT DOCUMENTS

| | | |
|---|---|---|
| DE | 102008055706 A1 | 5/2010 |
| DE | 102010020213 A1 | 11/2011 |
| DE | 102010040288 A1 | 3/2012 |
| EP | 3617519 A1 | 3/2020 |
| GB | 2431704 A | 5/2007 |
| JP | H0557450 U | 7/1993 |
| JP | 2008133745 A | 6/2008 |
| WO | 2019067465 A1 | 4/2019 |

OTHER PUBLICATIONS

International Preliminary Report on Patentability in corresponding PCT Application No. PCT/EP2021/081261, dated Feb. 23, 2023.
BE Search Report in corresponding BE Application No. 202005829, dated Jul. 28, 2021.

* cited by examiner

TURBOMACHINE WITH A SHAFT COUPLED TO AN IMPELLER WITH AN AXIALLY INTERPOSED FRICTION RING

FIELD OF THE INVENTION

This invention relates to turbomachines.

BACKGROUND OF THE INVENTION

A turbomachine is a machine in which energy is exchanged between a flow of fluid and one or more impellers arranged at and coupled to a shaft, wherein the shaft and the impellers are arranged to rotate together about an axis of rotation.

Turbomachines often comprise only one impeller, wherein this impeller is arranged in overhang and coupled to an axial plane (end face) of the shaft of the machine by means of a bolt connection. This coupling presents challenges. For example, a large torque has to be transferred over a limited interface. Furthermore, the mounting in overhang, where there are bearings only along one axial side of the impeller present, coupled with the very high speeds of the machine that can reach several tens of thousands of revolutions per minute, places very high demands on the alignment of the impeller and the shaft to minimize the imbalance of the rotating mass.

Especially during the start-up of the turbo machine, the opposite end face of the impeller tends to move relative to the end face of the shaft, which increases the rotational mass imbalance and can raise vibrations of the above acceptable levels. This relative displacement may comprise a relative radial displacement of both end faces opposite each other, a tilt of both end faces opposite each other, a torsional displacement of both end faces opposite each other, or a combination of two or more of these forms of displacement. This tendency to relative displacement increases as the impeller becomes heavier in relation to the shaft and as the torques acting on the shaft and/or impeller increase and/or vary faster.

The so-called Hirth coupling, in which the end face of the shaft and the opposite end face of the impeller are both provided with complementary tapered teeth that mesh with each other, is a calibrated solution for realizing such a coupling between impeller and shaft, which due to its self-centring nature counteracts the above-mentioned relative radial or torsional displacements. However, the manufacture of the required tooth profile on the end faces of the impeller and the shaft is laborious and time-consuming and therefore also expensive.

Document DE102010040288A1 attempts to solve this problem by placing one or more intermediate pieces—arranged concentrically around the bolt connecting the shaft and the impeller—between the end face of the shaft of the turbomachine and the opposite end face of the impeller. One end face of an intermediate piece is bolted to the end face of the shaft or impeller, while the other end face is provided with a tooth profile. Thus, by using two complementary spacers, one attached to the shaft end face and the other attached to the opposite impeller face, a Hirth coupling between shaft and impeller can be achieved without the difficulty of providing gearing on the end faces of shaft and impeller.

However, in the system of DE102010040288A1, bolt connections must be made between the one or more intermediate pieces and the shaft and/or the impeller. This entails extra steps in the manufacturing process and therefore a higher cost price. Furthermore, these bolted connections in turn must also remain aligned during machine operation; thus, the problem of relative radial displacement between two axially coupled rotating members is shifted from the interface between the impeller and the shaft to the interface between the one or more spacers and the shaft and/or the impeller.

Thus, there is a need for another solution for counteracting the relative radial displacement between the shaft and impeller of a turbomachine.

SUMMARY OF THE INVENTION

The object of the present invention is to provide a solution to at least one of the afore-mentioned drawbacks.

According to a first aspect of the invention there is disclosed a turbomachine, comprising a shaft with a first end and an impeller arranged at and coupled to the first end of the shaft, arranged together to rotate about an axis of rotation, characterised in that the turbomachine comprises a friction ring clamped between an axial surface (face) at the first end of the shaft and an opposite axial surface (end face) of the impeller.

In some embodiments, the turbomachine is characterised in that the impeller is coupled to the first end of the shaft by means of a draw bolt or draw bar connection.

In a draw bolt or draw bar connection, the shaft and the impeller are equipped to receive the draw bolt or draw bar. The draw bolt or draw bar is fixedly attached to one of the two parts, for instance, by screwing a first end of the draw bolt or draw bar into screw threads provided for this purpose in one of the two parts. Next, the bolt or bar is biased by applying a tensile force between its two ends. Thereafter, the second part, which also receives the bolt or bar, but is not yet fixedly attached to it, is clamped between the first part and the closing piece of the connection. This closing piece can be, for example, a nut that is screwed onto the second end of the bolt or bar. As soon as the closing piece has been fastened in the desired way, for example, by tightening the nut to the desired torque, the tensile force is released.

It is an advantage of these embodiments that a draw bolt or draw bar connection is a simple and inexpensive connection technique.

In some embodiments, wherein the impeller is coupled to the first end of the shaft by means of a draw bolt connection, the turbomachine is characterised in that the friction ring is clamped between the axial surface (end face) at the first end of the shaft and the opposite axial surface (end face) of the impeller by means of the draw bolt connection.

It is an advantage of these embodiments that no additional parts are required to clamp the friction ring.

In some embodiments, the turbomachine is characterised in that the impeller and shaft consist substantially of a different material, wherein the material of the impeller has a lower mass density than the material of the shaft.

It is an advantage of these embodiments that a lower mass density of the impeller allows for better impeller dynamics. For example, the impeller may consist substantially of aluminium, while the shaft consists substantially of steel.

In some embodiments, the turbomachine is characterised in that the friction ring is adapted to counteract relative displacement between the axial surface (end face) at the first end of the shaft and the opposite axial surface (end face) of the impeller.

In general, the centres of mass of the rotating parts of the turbomachine do not all coincide exactly with the rotational axis of the machine. During operation of the turbomachine, shock loads acting on the centres of mass of the rotating parts result in shear forces between the end face at the first end of the shaft and the opposite end face of the impeller. These shear forces are counteracted by the static and dynamic frictional forces between the above-mentioned end faces. If the shear forces exceed the static frictional forces, a relative displacement can occur between the above-mentioned end faces. Such relative displacement can increase the machine imbalance to an unacceptable level.

It is an advantage of these embodiments that the turbomachine does not require a coupling which has a self-centring character due to its geometry, such as, for example, a Hirth coupling, between the impeller and the shaft. The coupling between the impeller and the shaft acquires a greater self-centring tendency due to the presence of the friction ring. Preferably, the friction ring is so thin and light relative to the impeller and shaft that it does not adversely affect the degree of alignment quality of the turbomachine, even if the friction ring itself is not centred against the axis of rotation of the machine.

It is an additional advantage of these embodiments that the turbomachine can operate at a higher speed, a higher power, a higher mass flow rate or a combination of two or more of the foregoing than a turbomachine without the friction ring for the same degree of alignment quality of the turbomachine.

It is an additional advantage of these embodiments that the turbomachine can change speed more quickly than a turbomachine without the friction ring for the same allowable vibration level.

It is an additional advantage of these embodiments that the ratio of the impeller mass to the shaft mass can be greater than in a turbomachines without the friction ring for the same allowable vibration level.

It is an additional advantage of these embodiments that the turbomachine shaft can have a smaller diameter and/or a lower mass than the turbomachine shaft without the friction ring for the same allowable vibration level.

It is an additional advantage of these embodiments of the turbomachine that a greater torque can be transmitted between the shaft and the impeller than in a turbomachine without the friction ring for the same diameter of the shaft or for the same contact pressure on the end faces of the shaft and the impeller.

In some embodiments, wherein the friction ring is adapted to counteract relative displacement between the axial surface (end face) at the first end of the shaft and the opposite axial surface (end face) of the impeller, the turbomachine is characterised in that the axial surfaces of the friction ring are at least partially covered by a coating, wherein the coating comprises a substantially uniform layer of a metal or a metal alloy, as well as discrete particles which are at least partially enclosed in the layer of the metal or the metal alloy, wherein the median diameter of the particles is greater than the thickness of the layer of the metal or the metal alloy.

In some embodiments, wherein the axial surfaces of the friction ring are at least partially covered by a coating, wherein the coating comprises a substantially uniform layer of a metal or a metal alloy, as well as discrete particles which are at least partially enclosed in the layer of the metal or the metal alloy, where the median diameter of the particles is greater than the thickness of the layer of the metal or metal alloy, the turbomachine is characterised in that the hardness of the particles is greater than the hardness of the material of the opposite axial surface (end face) of the impeller.

It is an advantage of these embodiments that particles on the friction ring can penetrate the axial surface of the impeller and thereby increase the coefficient of friction between the impeller and the friction ring. This makes it possible, for example, to use an aluminium impeller, for example, in combination with a steel shaft. The latter combination is difficult to realize without the presence of the friction ring, since the allowable surface pressure of aluminium or the coefficient of friction between two surfaces in steel and aluminium, respectively, is too low to sufficiently counteract unacceptable displacements between the end faces of the impeller and the shaft, respectively, at normal operation of the turbomachine.

In some embodiments, wherein the hardness of the particles in the coating of the friction ring is greater than the hardness of the material of the opposite axial surface (end face) of the impeller, the turbomachine is characterised in that the particles consist substantially of diamond or a ceramic material.

In some embodiments, the turbomachine is characterised in that the impeller is a centrifugal impeller.

In some embodiments, the turbomachine is characterised in that the turbomachine is a compressor, a blower, or a turbine.

According to a second aspect of the invention, a method for counteracting a relative displacement between an impeller of a turbomachine and a shaft of the turbomachine is disclosed, wherein the impeller is coupled to a first end of the shaft and wherein both are arranged to move together to rotate about an axis of rotation, characterised in that the method comprises clamping a friction ring between an axial surface at the first end of the shaft and an opposite axial surface of the impeller.

The technical effects and advantages of the method according to the present invention correspond, mutatis mutandis, to those of the turbomachine according to the present invention.

According to a third aspect of the invention, a use of a friction ring in a turbomachine is disclosed, the turbomachine comprising a shaft with a first end and an impeller arranged at and coupled to the first end of the shaft, arranged together to rotate about an axis of rotation, wherein the friction ring is clamped between an axial surface at the first end of the shaft and an opposite axial surface of the impeller to counteract relative displacement between the axial surface at the first end of the shaft and the opposite axial surface of the impeller.

The technical effects and advantages of using a friction ring according to the present invention correspond, mutatis mutandis, to those of the turbomachine according to the present invention.

DETAILED DESCRIPTION OF THE INVENTION

The present invention is illustrated below with reference to specific embodiments. These specific embodiments are representative of the invention but should not be regarded as limiting. The invention is not limited to the specific embodiments shown and/or described below and alternative embodiments may be developed within the spirit of the description. The figures are purely schematic, do not necessarily represent all parts of the invention, are not limiting, and are not necessarily to scale.

When reference is made in the description to "an embodiment", this reference implies that a particular characteristic, structure or feature described with reference to this particular embodiment is included in one or more embodiments of the present invention. References to "one embodiment", "some embodiments, "a preferred embodiment" and the like in this specification may refer to the same embodiment but do not necessarily so. Furthermore, the specific characteristics, structures or features of the specific embodiments may be combined in any suitable manner in one or more embodiments.

Figure 1:
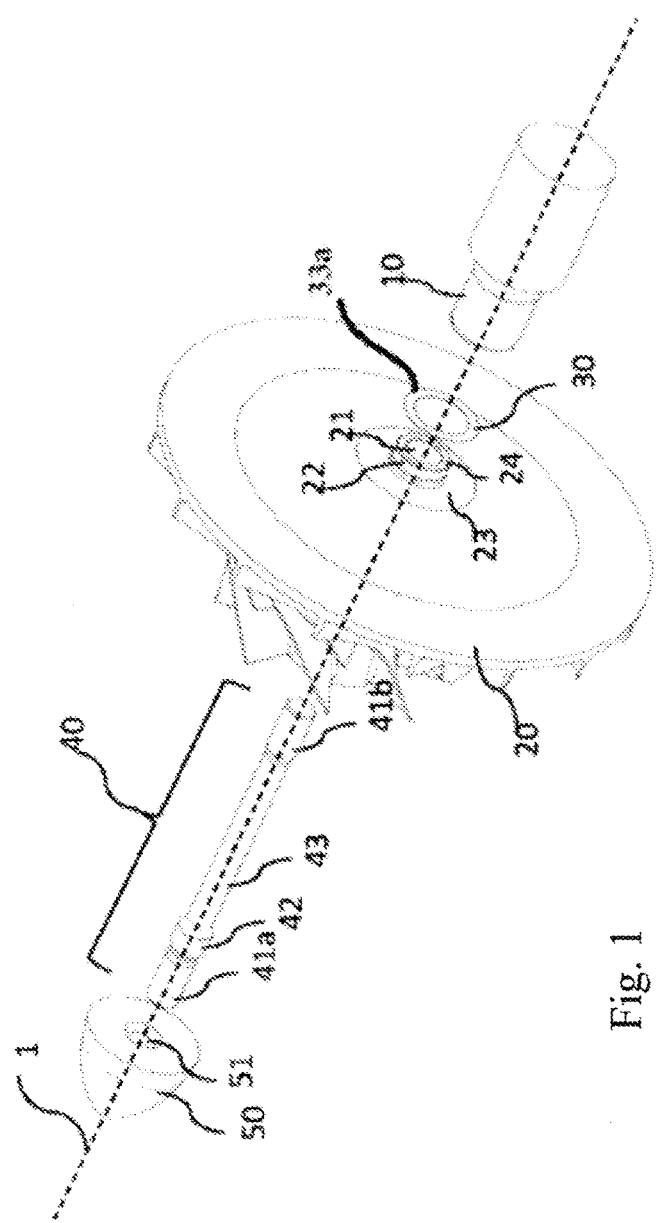
FIG. 1 shows a schematic exploded view of an embodiment of the turbomachine according to the present invention.

FIG. 1 shows a schematic exploded view of an embodiment of a turbomachine according to the present invention. Not all parts of the turbomachine are visible in the figure.

The illustrated embodiment comprises a shaft 10, an impeller 20, a friction ring 30, a draw bolt 40 and a nut 50. Preferably, each of these parts is substantially axisymmetric, wherein deviations from said axisymmetry arise from the tolerance limitations of the manufacturing processes used, wear, or the addition of one or more structures, the total mass of which is less than 10%, preferably less than 1%, more preferably less than 0.1%, even more preferably less than 0.01%, most preferably less than 0.001% by mass of the part to which these one or more structures are added. Preferably the alignment of each of these parts individually complies with the ISO 21940 standard with grade G 1, more preferably with grade G 0.7.

Preferably, these parts are aligned with respect to each other such that their individual axes of symmetry substantially coincide. These parts are arranged to rotate together about the axis of rotation 1 of the turbomachine. Preferably, these parts are aligned such that their individual axes of symmetry substantially coincide with the axis of rotation 1.

Figure 2:
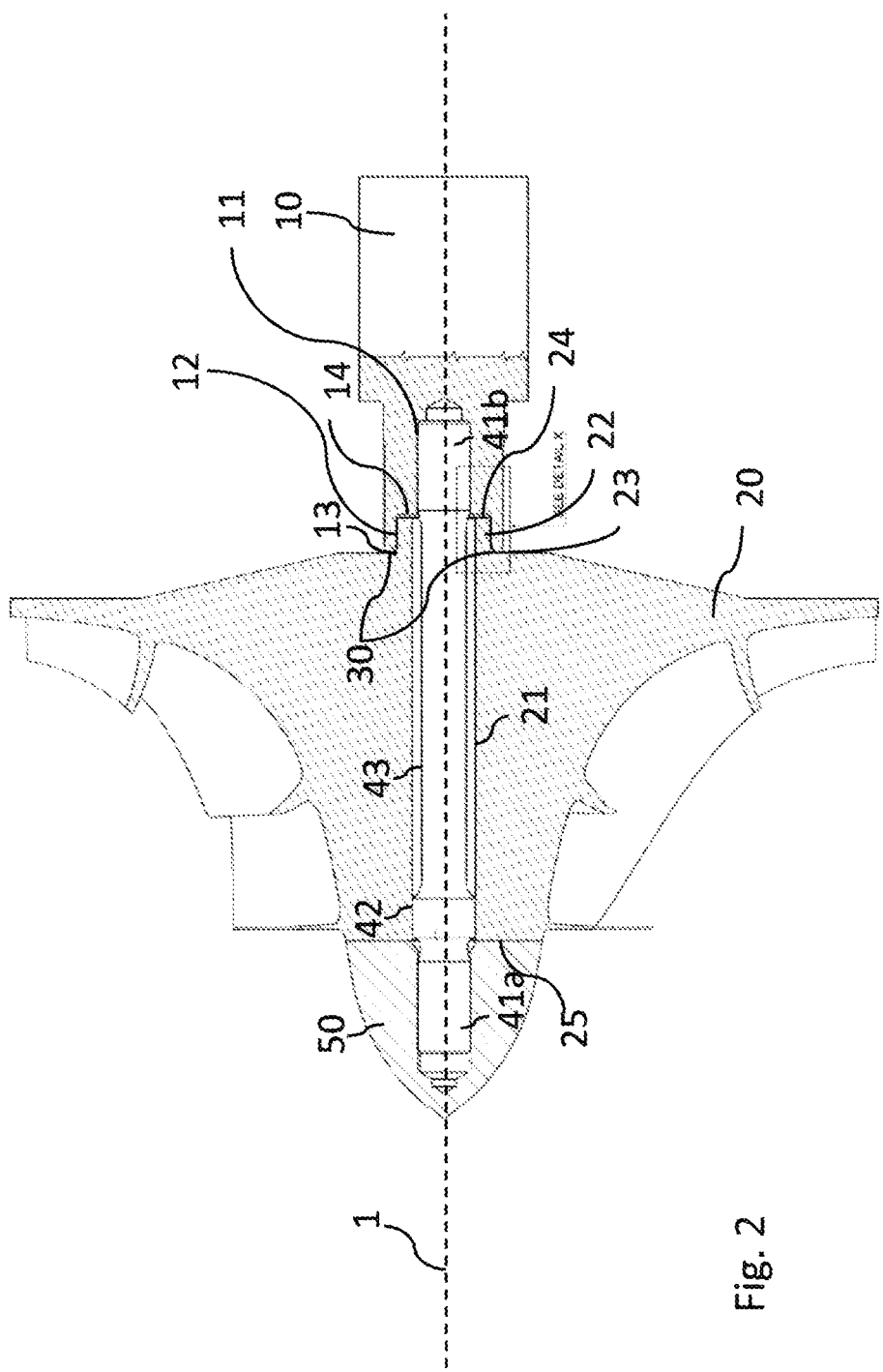
FIG. 2 shows a schematic cross-section along the axis 1 in FIG. 1.
Figure 3:
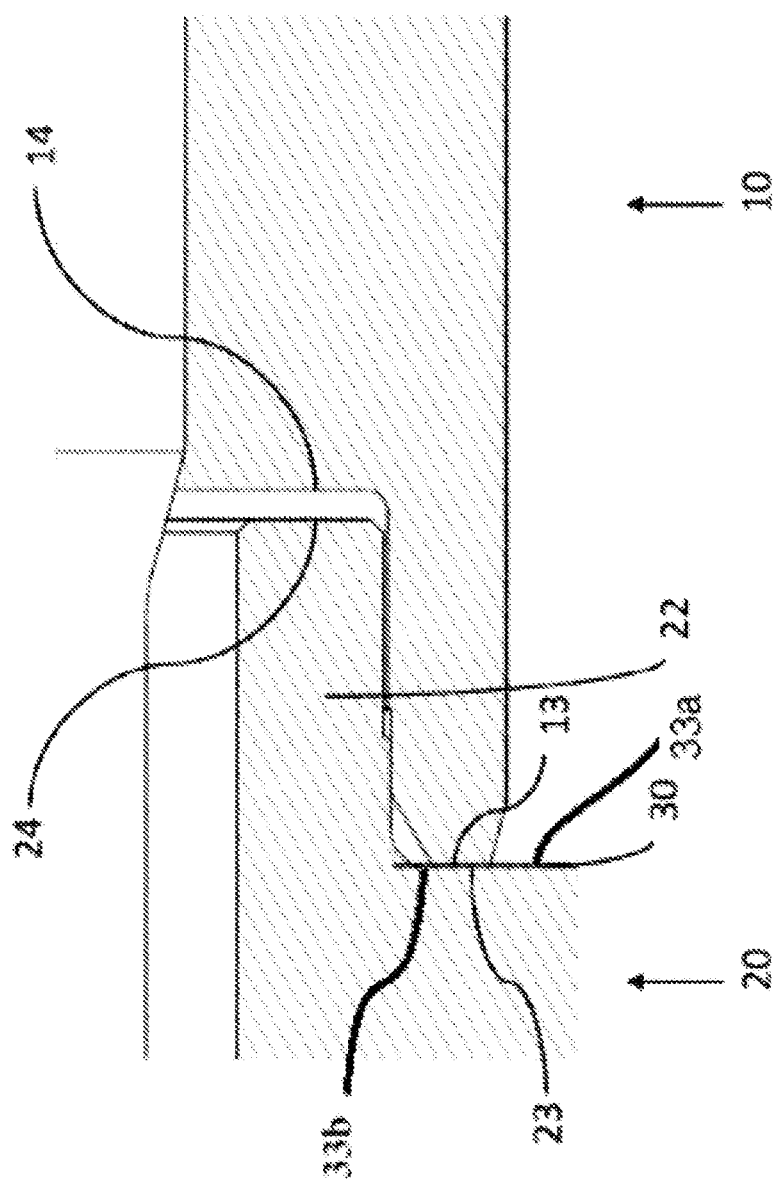
FIG. 3 shows a schematic enlargement of the area X according to the cross-section of FIG. 2.

FIG. 2 and FIG. 3 show more details of these parts. The parts and assembly of the illustrated embodiment are described below, and then their cooperation in the illustrated embodiment is explained.

The shaft 10 comprises a first axial bore 11, which is substantially concentric with the axis of symmetry of the shaft 10. The shaft 10 comprises a second axial bore 12, which is substantially concentric with the first axial bore 11 and with the axis of symmetry of the shaft 10. The first axial bore 11 is deeper than the second axial bore 12. The first axial bore 11 has a smaller diameter than the second axial bore 12.

Preferably, the second axial bore 12 has a depth greater than 1 mm, more preferably a depth greater than 3 mm, even more preferably a depth greater than 5 mm, most preferably a depth greater than 10 mm. Preferably, the second axial bore 12 has a depth less than 50 mm, more preferably a depth less than 40 mm, even more preferably a depth less than 30 mm, most preferably a depth less than 20 mm.

Preferably, the first axial bore 11 has a depth that is at least 20 mm greater than the depth of the second axial bore 12, more preferably a depth that is at least 30 mm greater, even more preferably a depth that is at least 40 mm greater, most preferably a depth that is at least 50 mm greater. Preferably, the first axial bore 11 has a depth that is less than 100 mm greater than the depth of the second axial bore 12, more preferably a depth that is less than 90 mm greater, even more preferably a depth that is less than 80 mm greater, most preferably a depth that is less than 70 mm greater.

Preferably, the second axial bore 12 has a diameter greater than 60% of the diameter of the shaft 10, more preferably a diameter greater than 65% of the diameter of the shaft, even more preferably a diameter greater than 70% of the diameter of the shaft, most preferably a diameter greater than 75% of the diameter of the shaft. Preferably, the second axial bore 12 has a diameter less than 95% of the diameter of the shaft 10, more preferably a diameter less than 90% of the diameter of the shaft, even more preferably a diameter less than 85% of the diameter of the shaft, most preferably a diameter less than 80% of the diameter of the shaft.

Preferably, the first axial bore 11 has a diameter that is greater than 10% of the diameter of the shaft 10, more preferably a diameter that is greater than 15% of the diameter of the shaft, even more preferably a diameter that is greater than 20% of the diameter of the shaft, most preferably a diameter that is greater than 25% of the diameter of the shaft. Preferably the first axial bore 11 has a diameter that is smaller than 50% of the diameter of the shaft 10, more preferably a diameter that is smaller than 45% of the diameter of the shaft, even more preferably a diameter that is smaller than 40% of the diameter of the shaft, most preferably a diameter that is smaller than 35% of the diameter of the shaft.

The first axial bore 11 and the second axial bore 12 define two substantially concentric annular end faces on the shaft 10. The first end face 13 is located at the end of the shaft and is defined by the diameter of the shaft and the diameter of the second axial bore 12. The second end face 14 is recessed in the second axial bore 12 and is defined by the diameters of the first and second axial bores. Preferably, both end faces are substantially planar, except for rounding or chamfering at their edges, and located in a plane substantially perpendicular to the axis of symmetry of the shaft 10.

The shaft 10 is preferably made of steel. This steel can be unalloyed, low-alloyed or high-alloyed. The shaft 10 may also be made of other suitable materials known to those skilled in the art.

The embodiment shown comprises a centrifugal impeller 20. Such impeller can, for instance, be used in a centrifugal compressor, blower, or turbine. At the axial end facing the shaft 10, the impeller 20 comprises an axial protrusion 22, which is substantially cylindrical and is substantially concentric with the axis of symmetry of the impeller 20. The impeller 20 and the axial protrusion 22 comprise an axial bore 21, which is substantially concentric with the axis of symmetry of the impeller 20 and the axial protrusion 22 and extends over the full axial depth of the impeller 20 and the axial protrusion 22.

The axial protrusion 22 defines two end faces on the axial end of the impeller 20, where it is located. The inner diameter of the first end face 23 is defined by the outer diameter of the axial protrusion 22. The outer diameter of the first end face 23 is defined by the diameter at which the axial end is no longer substantially planar and lies in a plane substantially perpendicular to the axis of symmetry of the impeller 20. The second end face 24 is located at the axial end of the axial protrusion 22. The inner diameter of the second end face 24 is defined by the diameter of the axial bore 21. The outer diameter of the second end face 24 is defined by the outer diameter of the axial protrusion 22.

Preferably, the first end face 23 of the impeller 20 has an outer diameter that is greater than the outer diameter of the first end face 13 of the shaft 10.

The axial protrusion 22 has an outer diameter which is smaller than the inner diameter of the second axial bore 12 in the shaft 10. This has the advantage that, when the turbomachine is assembled, the axial protrusion 22 can be inserted into the second axial bore 12. Preferably, the outer diameter of the axial protrusion 22 is at most 10% smaller than the inner diameter of the second axial bore 12 in the shaft 10, more preferably at most 1% smaller, most preferably at most 0.1% smaller. This small difference in diameter has the advantage that the outer wall of the axial protrusion 22 makes contact with the inner wall of the second axial bore 12 upon assembly of the turbomachine, thereby contributing to the relative alignment of the impeller 20 with respect to the shaft 10. Preferably, the outer diameter of the axial protrusion 22 is at least 0.01% smaller than the inner diameter of the second axial bore 12.

Preferably, the length of the axial protrusion 22 is smaller than the depth of the second axial bore 12 in the shaft 10. This has the advantage that the second end faces 14 and 24 on the shaft 10 and the impeller 20, respectively, cannot make contact upon assembly of the turbomachine. Preferably, the length of the axial protrusion 22 is at least 5% less than the depth of the second axial bore 12 in the shaft 10. However, in some not illustrated and non-preferred embodiments, the length of the axial protrusion 22 may be equal to or greater than the depth of the second axial bore 12 allowing the end faces 14 and 24 to contact upon assembly of the turbomachine.

In some embodiments, the impeller 20 may be made substantially of steel. This steel can be unalloyed, low-alloyed or high-alloyed. In some embodiments, the impeller 20 may be substantially made of aluminium or aluminium alloy. In some embodiments, the impeller 20 may consist substantially of a metal other than steel or aluminium and preferably having a lower mass density than steel, or of an alloy of this metal.

In some embodiments, the impeller 20 may consist substantially of a different material than the shaft 10, with the hardness of both materials not necessarily being the same. A preferred embodiment comprises an impeller 20 which consists substantially of aluminium or aluminium alloy and a shaft 10 which consists substantially of steel.

The friction ring 30 comprises a substantially circular and substantially planar disc with concentric inner and outer diameters. Preferably, the friction ring 30 has an inner diameter that is larger than the outer diameter of the axial protrusion 22.

This has the advantage that the friction ring 30 can be arranged around the axial protrusion 22 upon assembly of the turbomachine. Preferably, the inner diameter of the friction ring 30 is at most 10% larger than the outer diameter of the axial protrusion 22, more preferably at most 1% larger, most preferably at most 0.05% larger. This small difference in diameter has the advantage that the outer wall of the axial protrusion 22 makes contact with the inner wall of the friction ring 30 upon assembly of the turbomachine and thereby contributes to the relative alignment of the friction ring 30 with respect to the impeller 20. Preferably, the inner diameter of the friction ring 30 is at least 0.01% greater than the outer diameter of the axial protrusion 22. In some embodiments not illustrated, the friction ring 30 may include an axial protrusion on its outer diameter. This protrusion can, for example, serve to visually check the presence of the friction ring. In some embodiments not illustrated, the friction ring 30 may take on a shape other than a substantially circular and substantially planar disk having a concentric inner and outer diameter.

Both end faces 33a and 33b of the friction ring 30 are substantially covered with a coating. Preferably at least 50% of both end faces are covered with the coating, more preferably at least 60%, even more preferably at least 70%, most preferably both end faces are substantially completely covered. The coating comprises a substantially uniform layer of a metal or metal alloy, as well as discrete particles, which are partially enclosed in the layer of the metal or the metal alloy. The median diameter of the discrete particles is greater than the median thickness of the uniform layer and the average diameter of the discrete particles is greater than the average thickness of the uniform layer. The discrete particles consist substantially of diamond or a ceramic material. The hardness of the discrete particles is greater than the hardness of steel. Preferably, the discrete particles have an average diameter greater than 10 microns, more preferably greater than 20 microns, even more preferably greater than 30 microns, most preferably greater than 40 microns. Preferably, the average thickness of the uniform layer is greater than 60% of the average thickness of the discrete particles. Preferably, the average thickness of the uniform layer is less than 90% of the average thickness of the discrete particles. Preferably, the surface density of discrete particles is greater than 50 particles/mm$^2$, more preferably greater than 100 particles/mm$^2$, even more preferably greater than 200 particles/mm$^2$, most preferably greater than 500 particles/mm$^2$. Preferably, the discrete particles are substantially uniformly distributed over the end faces 33a and 33b so as not to degrade the quality of the alignment of the friction ring.

In the embodiment shown, the impeller 20 is coupled in overhang to one end of the shaft 10 by inserting the draw bolt 40 into the axial bores 11 and 21 of the shaft 10 and the impeller 20, respectively. Thereby, the impeller 20 is oriented relative to the axis 10 such that the axial protrusion 22 points in the direction of the axis 10. Preferably, the friction ring 30 is positioned around the axial protrusion 22 so that it is located between the end faces 13 and 23. However, in some not illustrated embodiments, the friction ring 30 can be positioned in the second axial bore 12 so that it is located between the end faces 14 and 24.

The draw bolt is threaded on both ends 41a and 41b. Preferably, the draw bolt is provided with a neck 43 having a diameter smaller than the diameter of the axial bore 21. Preferably, the draw bolt is provided with a shoulder 42. Preferably, the diameter of the shoulder 42 is substantially equal to the diameter of the axial bore 21. Preferably, prior to insertion, the draw bolt 40 undergoes a treatment, such as, for example, cooling by means of liquid nitrogen, such that the shoulder 42 can be inserted and positioned in the axial bore 21.

The threaded end 41b is screwed into the first axial bore 11 of the shaft 10, which is provided with compatible threads. The nut 50, which has an opening 51 with compatible threads, is screwed onto the end 41a. By tightening the nut 50, the impeller 20 and the shaft 10 move towards each other. The axial protrusion is inserted into the second axial bore 12.

Nut 50 is tightened at least until the first end faces 13 and 23 of shaft 10 and impeller 20, respectively, contact both end faces 33a and 33b of friction ring 30, respectively, or, in some not illustrated and non-preferred embodiments, until the second end faces 14 and 24 of the shaft 10 and the impeller 20, respectively, make contact with the two end faces 33a and 33b, respectively, of the friction ring 30. Preferably, the nut 50 in its final position contacts the third end face 25 of the impeller 20. Preferably, the draw bolt 40 is pretensioned before the nut 50 is tightened. Preferably, the tension of the draw bolt occurs with a tensile force greater than or equal to 200 kN. Preferably, the tension of the draw bolt occurs with a tensile force of less than or equal to 350 kN. Preferably, the nut 50 is tightened until the first axial end faces 13 and 23 are pressed against the respective end faces 33a and 33b with a contact pressure greater than or equal to 500 MPa. Preferably, the nut 50 is tightened until the first axial end faces 13 and 23 are pressed against the respective end faces 33a and 33b with a contact pressure less than or equal to 800 MPa. By biasing the draw bolt 40 and tightening the nut 50, the discrete particles on the end faces 33a and 33b of the friction ring are forced into the end faces 13 and 23 of the shaft 10 and the impeller 20, respectively. Preferably, the discrete particles penetrate more than 2 microns into the end faces 13 and 23, more preferably more than 5 microns, most preferably more than 10 microns.

Since the impeller 20 is coupled in overhang to the shaft 10, there are only bearings (not shown in the figures) along one axial side of the impeller 20.

Preferably, the impeller 20 of the turbomachine rotates at the normal operating point of the machine with a speed of more than 5000 revolutions per minute around the axis of rotation 1, more preferably more than 10000 revolutions per minute, most preferably more than 20000 revolutions per minute. Preferably, the mass of the impeller 20 is greater than or equal to 50% of the mass of the shaft 10. Preferably, the mass of the impeller 20 is less than or equal to 400% of the mass of the shaft 10.

The single-sided bearings, together with the speeds achieved and the mass ratio between impeller and shaft place very high demands on the alignment of the turbomachine. Preferably, the alignment of the turbomachine for rotation about the axis of rotation 1 after assembly complies with the ISO 21940 standard with grade G 6.3, more preferably with grade G 2.5, most preferably with grade G 1.

During operation of the turbomachine, the centrifugal forces acting on the centres of mass of the rotating parts, which generally do not all coincide exactly with the axis of rotation 1, lead to shear forces between the end face 33a of the friction ring 30 and the end face 13 of the shaft 10 and between the end face 33b of the friction ring 30 and the end face 23 of the impeller 20. These shear forces are counteracted by the static and dynamic frictional forces between the above-mentioned end faces. If the shear forces exceed the static frictional forces, a radial displacement can occur between the above-mentioned end faces. Such radial displacement can increase the imbalance of the machine to an unacceptable level.

Due to the presence of the friction ring 30, the discrete particles contained in the coating of the end faces 33a and 33b are pressed into the end faces 13 and 23 during assembly of the turbomachine as described above. As a result of this depression, the coefficients of friction, and thus also the frictional forces, increase between the end face 33a of the friction ring 30 and the end face 13 of the shaft 10 and between the end face 33b of the friction ring 30 and the end face 23 of the impeller 20. Preferably, the static friction coefficient between the above-mentioned end faces is greater than 0.4, more preferably greater than 0.5, even more preferably greater than 0.6, most preferably greater than 0.7.

Due to the greater friction coefficients and the resulting greater frictional forces between the opposing end faces, radial displacement between the end faces is counteracted and in amplitude reduced or avoided.

It is an advantage of an embodiment of the turbomachine according to the present invention that the impeller can be made of aluminium. An aluminium impeller is lighter, allows more dynamic rotor behaviour, and requires less precise alignment, but without a friction ring, the frictional forces between an aluminium impeller and a steel shaft are too small to counteract radial displacements between impeller and shaft under normal operating conditions of the turbo machine. The skilled person will understand that the other advantages of the embodiment mentioned also apply to any combination of materials for shaft and impeller, such as, for example, for the combination of a steel impeller with a steel shaft.

It is an advantage that an embodiment of the turbomachine according to the present invention does not require a self-centring coupling, such as, for example, a Hirth coupling, between the impeller 20 and the shaft 10.

It is an advantage that an embodiment of the turbomachine of the present invention can operate at a higher speed than a turbomachine without the friction ring for the same allowable vibration level.

It is an advantage that an embodiment of the turbomachine of the present invention can change speed more quickly than a turbomachine without the friction ring for the same allowable vibration level.

It is an advantage of an embodiment of the turbomachine according to the present invention that the ratio between the mass of the impeller and the mass of the shaft can be greater than in a turbomachine without the friction ring for the same allowable vibration level.

The invention claimed is:

1. A turbomachine comprising a shaft with a first end and an impeller arranged at and coupled to the first end of the shaft by a draw bolt connection, arranged together to rotate about an axis of rotation, wherein the shaft comprises a stepped axial bore, comprising a first axial bore and a second axial bore, the first axial bore being deeper than the second axial bore at the first end, and the impeller comprises a stepped an axial protrusion, the first axial bore being arranged to receive the draw bolt and the second axial bore being arranged to house the axial protrusion, the turbomachine further comprising a friction ring clamped between an axial surface at the first end of the shaft, surrounding the second axial bore, and an opposite axial surface of the impeller, surrounding the axial protrusion, wherein the friction ring includes first and second planar end faces that are at least partially covered by a coating, the coating including a layer of a metal or metal alloy and discrete particles that are at least partially enclosed in the layer of metal or metal alloy, and wherein the discrete particles have a median diameter that is greater than the thickness of the layer of metal or metal alloy such that the particles penetrate the axial surface at the first end of the shaft and the opposite axial surface of the impeller when the draw bolt is tightened by screwing it into the first axial bore to move the axial surface at the first end of the shaft towards the opposite axial surface of the impeller to increase frictional forces between the friction ring and axial surfaces of the shaft and impeller, and thereby increase a magnitude of shear forces necessary to cause radial displacement between the impeller and the shaft.

2. The turbomachine according to claim 1, wherein the friction ring is clamped between the axial surface at the first end of the shaft and the opposite axial surface of the impeller by the draw bolt connection.

3. The turbomachine according to claim 1, wherein the impeller and the shaft consist substantially of a different material, wherein the material of the impeller has a lower mass density than the material of the shaft.

4. The turbomachine according to claim 1, wherein the friction ring is adapted to counteract a relative displacement between the axial surface at the first end of the shaft and the opposite axial surface of the impeller.

5. The turbomachine according to claim 1, wherein the hardness of the particles is greater than the hardness of the material of the opposite axial surface of the impeller.

6. The turbomachine according to claim 5, wherein the particles consist substantially of diamond or a ceramic material.

7. The turbomachine according to claim 1, wherein the impeller is a centrifugal impeller.

8. The turbomachine according to claim 1, wherein the turbomachine is a compressor, a blower, or a turbine.

9. The turbomachine according to claim 1, wherein the discrete particles penetrate at least two microns into the axial surface of the shaft and the opposite axial surface of the impeller.

10. The turbomachine according to claim 9, wherein the discrete particles penetrate at least 10 microns into the axial surface of the shaft and the opposite axial surface of the impeller.

11. The turbomachine according to claim 1, wherein a static friction coefficient between the end faces of the friction ring and respective axial ends surfaces of the shaft and impeller is greater than 0.4.

12. The turbomachine according to claim 11, wherein said static friction coefficient is greater than 0.7.

13. A method for counteracting a relative displacement between an impeller of a turbomachine and a shaft of the turbomachine, wherein the impeller is coupled to a first end of the shaft, wherein both the impeller and the shaft are arranged to move together to rotate about an axis of rotation, wherein the friction ring includes first and second planar end faces that are at least partially covered by a coating, the coating including a layer of a metal or metal alloy and discrete particles that are at least partially enclosed in the layer of metal or metal alloy, and wherein the discrete particles have a median diameter that is greater than the thickness of the layer of metal or metal alloy, the method comprising inserting a draw bolt into a first axial bore at a first end of the shaft and inserting an axial protrusion of the impeller into a second axial bore at the first end of the shaft, the first axial bore being deeper than the second axial bore, the first axial bore arranged to house the draw bolt and the second axial bore arranged to house the axial protrusion, wherein the draw bolt is threaded into first axial bore and tightened to secure the impeller to the shaft; and clamping a friction ring between an axial surface at the first end of the shaft, surrounding the second axial bore, and an opposite axial surface of the impeller, surrounding the axial protrusion upon tightening the draw bolt by threading an end of the draw bolt into the first axial bore to move the impeller and shaft towards each other to cause the particles to penetrate an axial surface at the first end of the shaft and an opposite axial surface of the impeller when the draw bolt is tightened by screwing it into the first axial bore to move the axial surface at the first end of the shaft towards the opposite axial surface of the impeller to increase frictional forces between the friction ring and axial surfaces of the shaft and impeller, and thereby increase a magnitude of shear forces necessary to cause radial displacement between the impeller and the shaft.

* * * * *